US010983808B2

(12) United States Patent
Noh et al.

(10) Patent No.: US 10,983,808 B2
(45) Date of Patent: Apr. 20, 2021

(54) METHOD AND APPARATUS FOR PROVIDING EMOTION-ADAPTIVE USER INTERFACE

(71) Applicant: Electronics and Telecommunications Research Institute, Daejeon (KR)

(72) Inventors: Kyoung Ju Noh, Daejeon (KR); Hyun Tae Jeong, Daejeon (KR); Ga Gue Kim, Daejeon (KR); Ji Youn Lim, Daejeon (KR); Seung Eun Chung, Daejeon (KR)

(73) Assignee: Electronics and Telecommunications Research institute, Daejeon (KR)

( * ) Notice: Subject to any disclaimer, the term of this patent is extended or adjusted under 35 U.S.C. 154(b) by 0 days.

(21) Appl. No.: 16/547,755

(22) Filed: Aug. 22, 2019

(65) Prior Publication Data
US 2020/0225963 A1    Jul. 16, 2020

(30) Foreign Application Priority Data

Jan. 16, 2019   (KR) .................. 10-2019-0005622

(51) Int. Cl.
*G06F 9/451*   (2018.01)
*G06F 3/01*    (2006.01)

(52) U.S. Cl.
CPC .............. *G06F 9/451* (2018.02); *G06F 3/011* (2013.01); *G06F 2203/011* (2013.01)

(58) Field of Classification Search
CPC ..... G06F 2203/011; G06F 3/011; G06F 9/451
See application file for complete search history.

(56) References Cited

U.S. PATENT DOCUMENTS

| 8,775,186 B2 | 7/2014 | Shin et al. |
| 8,932,229 B2 | 1/2015 | Jo et al. |
| 9,569,424 B2* | 2/2017 | Martinez ................. G10L 15/26 |
| 2008/0059158 A1* | 3/2008 | Matsuo ............ H04M 1/72544 704/221 |
| 2009/0002178 A1* | 1/2009 | Guday .................. G06F 3/0346 340/573.1 |

(Continued)

FOREIGN PATENT DOCUMENTS

| KR | 1020150099430 A | 8/2015 |
| KR | 101562792 B1 | 10/2015 |
| KR | 1020180007006 A | 1/2018 |

OTHER PUBLICATIONS

Meudt S, Schmidt-Wack M, Honold F, Schussel F, Michael Weber M, Schwenker F, Palm G (2016) Going further in affective computing: how emotion recognition can improve adaptive user interaction. 49 pages (Year: 2016).*

(Continued)

*Primary Examiner* — Andrea N Long
(74) *Attorney, Agent, or Firm* — William Park & Associates Ltd.

(57) ABSTRACT

The present invention relates to a method and apparatus for providing an emotion-adaptive user interface (UI) on the basis of an affective computing service, in which the provided service is configured with at least one of a service operation condition, a service end condition, and an emotion-adaptive UI service type on the basis of purpose information of the service, and the detailed pattern is changed and provided on the basis of the purpose information and the usefulness information of the service.

20 Claims, 9 Drawing Sheets

(56) References Cited

U.S. PATENT DOCUMENTS

| | | | |
|---|---|---|---|
| 2010/0240416 A1* | 9/2010 | Knight | H04M 1/72522 |
| | | | 455/566 |
| 2011/0137137 A1* | 6/2011 | Shin | A61B 5/02405 |
| | | | 600/301 |
| 2011/0207100 A1* | 8/2011 | Brokken | G06F 3/011 |
| | | | 434/236 |
| 2013/0044128 A1* | 2/2013 | Liu et al. | G06T 19/006 |
| | | | 345/633 |
| 2014/0229175 A1* | 8/2014 | Fischer | G10L 15/22 |
| | | | 704/235 |
| 2014/0234815 A1 | 8/2014 | Jang et al. | |
| 2015/0277683 A1* | 10/2015 | Eteminan | G06F 16/955 |
| | | | 715/745 |
| 2017/0004459 A1* | 1/2017 | Karsten | G08B 1/08 |
| 2018/0132776 A1* | 5/2018 | Flickinger | A61B 5/6803 |
| 2020/0225963 A1* | 7/2020 | Noh | G06F 3/167 |

OTHER PUBLICATIONS

K. Dalvand and M. Kazemifard, "An adaptive user-interface based on user's emotion," 2012 2nd Int. eConference Comput. Knowl. Eng. ICCKE 2012, pp. 161-166, 2012. (Year: 2012).*

Galindo, J. et al.: Using user emotions to trigger UI adaptation, Proc.12th Int. Conf. on Research Challenges in Information Science (RCIS), (2018) (Year: 2018).*

* cited by examiner

METHOD AND APPARATUS FOR PROVIDING EMOTION-ADAPTIVE USER INTERFACE

CROSS REFERENCE TO RELATED APPLICATION

The present application claims priority to Korean Patent Application No. 10-2019-0005622, filed Jan. 16, 2019, the entire contents of which is incorporated herein for all purposes by this reference.

BACKGROUND OF THE INVENTION

Field of the Invention

The present invention relates to a method and apparatus for providing an emotion-adaptive user interface (UI) capable of being utilized in an affective computing service based on user emotion information.

Description of the Related Art

Recently, research and development related to life-logging for storing and analyzing daily experience data and providing useful services to users has steadily progressed. For example, there are various personal wearable and portable devices, and such a device may sense bio-signals such as user's physical activity and pulse and thus provide an operation mode, for example vibration according to whether a user reaches a target physical activity during a day. In recent years, there has been a demand for an affective computing service that is capable of actively improving the quality of user's physical and mental health on the basis of the user's experience data, which goes beyond a simple function of providing a behavior monitoring or a notification service to a user.

Service and user interface (UI) in terms of affective computing aim at improving service quality with respect to usefulness, usability, and emotion. Accordingly, in order to provide an affective computing service, it is necessary to provide an emotion-adaptive user interface (UI) that efficiently recognizes user emotion information and operates to conform to the purpose of an affective computing service.

A document 1 as the related art (Apparatus and Method for Emotion Interaction Based on Biological Signals, US2014-0234815) is related to a technology that recognizes a user's emotion state based on a bio-signal and transfers an emotion between the person and the product.

A document 2 (Method for Emotion Communication between Emotion Signal Sensing Device and Emotion Service Providing Device, U.S. Pat. No. 8,775,186) discloses an emotion communication protocol between an emotion signal sensing device and an emotion service providing device.

However, there is insufficient research on a method of dynamically changing and providing the UI pattern in a manner to satisfy the service purpose on the basis of the purpose information of an affective computing service, the user's emotion recognized in real time, and the user experience (UX) information about the existing UI.

SUMMARY OF THE INVENTION

The objective of the present invention is to provide an emotion-adaptive UI for an affective computing service, the emotion-adaptive UI being capable of actively improving quality of user's physical and mental health on the basis of user experience data.

The present invention is intended to provide a service for which UI is suited to the purpose thereof.

The present invention is intended to utilize user experience information (UX) so as to recognize the service purpose and to be operated in accordance with the user's emotion.

The present invention is intended to provide service based on user emotion information recognized on the basis of bio-signals and voice/video data.

The present invention is intended to provide an emotion-adaptive UI based on the usefulness information of the corresponding UI dynamically calculated on the basis of the emotion service purpose information and the user emotion information.

It is to be understood that technical problems to be solved by the present disclosure are not limited to the aforementioned technical problems and other technical problems which are not mentioned will be apparent from the following description to a person with an ordinary skill in the art to which the present disclosure pertains.

The present invention relates to a method and apparatus for providing an emotion-adaptive UI on the basis of an affective computing service.

The present invention may include an emotion recognition unit acquiring an input signal for emotion information of a user, an emotion-adaptive UI execution unit providing a service based on the acquired input signal for the emotion information through the emotion-adaptive UI and calculating usefulness information for the service, and an emotion-adaptive UI/UX management unit reflecting a feedback based on the usefulness information for the provided service. The service may be configured with at least one of a service operation condition, a service end condition, and an emotion-adaptive UI service type on the basis of purpose information of the service, and the emotion-adaptive UI service type is configured with one or more detailed patterns.

According to an embodiment of the present invention, the service is provided, the detailed pattern may be changed and provided on the basis of at least one of the purpose information and the usefulness information included in user experience information.

According to an embodiment of the present invention, the apparatus may be provided to operate one or more emotion-adaptive UI service types from sound service, display service, vibration service, and tactile service.

According to an embodiment of the present invention, the apparatus may correspond to a wearable device.

According to an embodiment of the present invention, the usefulness information may correspond to an evaluation index for the service provided through the emotion-adaptive UI, and may be determined on the basis of the purpose information of the service.

According to an embodiment of the present invention, when the service is provided, the detailed patterns included in the service may be changed in a manner to satisfy the purpose information of the service on the basis of the purpose information of the service.

According to an embodiment of the present invention, in a case that the detailed pattern is changed in a manner to satisfy the purpose information of the service, when the usefulness calculated for the detailed pattern is equal to or greater than a threshold value according to a result of providing the service having the detailed pattern, it may be determined that the purpose information of the service is satisfied.

According to an embodiment of the present invention, the service usefulness information of the usefulness information may be calculated on the basis of at least one of the emotion information at the start of the detailed pattern of the service, the emotion information at the end of the detailed pattern, and the purpose information of the service.

According to an embodiment of the present invention, the detailed pattern usefulness information of the usefulness information may be calculated on the basis of at least one of a difference between the emotion information at the start of the detailed pattern and the emotion information at the end of the detailed pattern and the purpose information of the service.

According to an embodiment of the present invention, the service operation condition and the service end condition may include at least one of time attribute for operating the service, current emotion information, target emotion information, and place information.

According to an embodiment of the present invention, the emotion-adaptive UI service type may include a sound service, a display service, a vibration service, and a tactile service, and the service provided through the emotion-adaptive UI may include at least one of a sound service, a display service, a vibration service, and a tactile service.

According to an embodiment of the present invention, the detailed pattern may correspond to the detailed attribute for the emotion-adaptive UI service type, and correspond to a method of controlling the emotion-adaptive UI service type.

According to an embodiment of the present invention, when the service is provided, the purpose information of the user experience information for the service may be checked, and the detailed pattern included in the service may be determined on the basis of the usefulness information included in the corresponding information.

According to an embodiment of the present invention, the input signal for the user emotion information may include at least one of bio-signal data, voice data, and video data of the user, and the emotion information may be recognized on the basis of the input signal using an emotion recognition model.

According to an embodiment of the present invention, when default purpose information is selected as the purpose information of the service, the default purpose information may include emotion awakening purpose, emotion control purpose, and emotion consolation purpose.

According to an embodiment of the present invention, when a feedback is reflected on the operation of the emotion-adaptive UI based on the usefulness information for the provided service, information on the detailed pattern for the provided service may be updated.

According to the present invention, it is possible to provide an emotion-adaptive UI for affective computing services that are capable of actively improving quality of user's physical and mental health on the basis of user experience data.

The present invention has an advantage that provides a service for which UI is suited to the purpose thereof.

The present invention has an advantage that utilizes the user experience information (UX) so as to recognize the service purpose and to be operated in accordance with the user's emotion.

The present invention has an advantage that a service based on user emotion information recognized on the basis of bio-signals and voice/video data can be provided.

The present invention has an advantage that a an emotion-adaptive UI based on the usefulness information of the corresponding UI dynamically calculated on the basis of the purpose information of the emotion service and the user emotion information can be provided.

Through the method of providing the emotion-adaptive UI according to the present invention, there is an effect that a service capable of adapting to a variance of user's emotion can be provided.

According to the present invention, it is possible to provide a UI that is personalized to be suitable for user's physical and emotional situations by utilizing the user experience information.

Through the implementation of the present invention, a UI suitable for the purpose of various affective computing services can be operated.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION OF THE INVENTION

Figure 1:
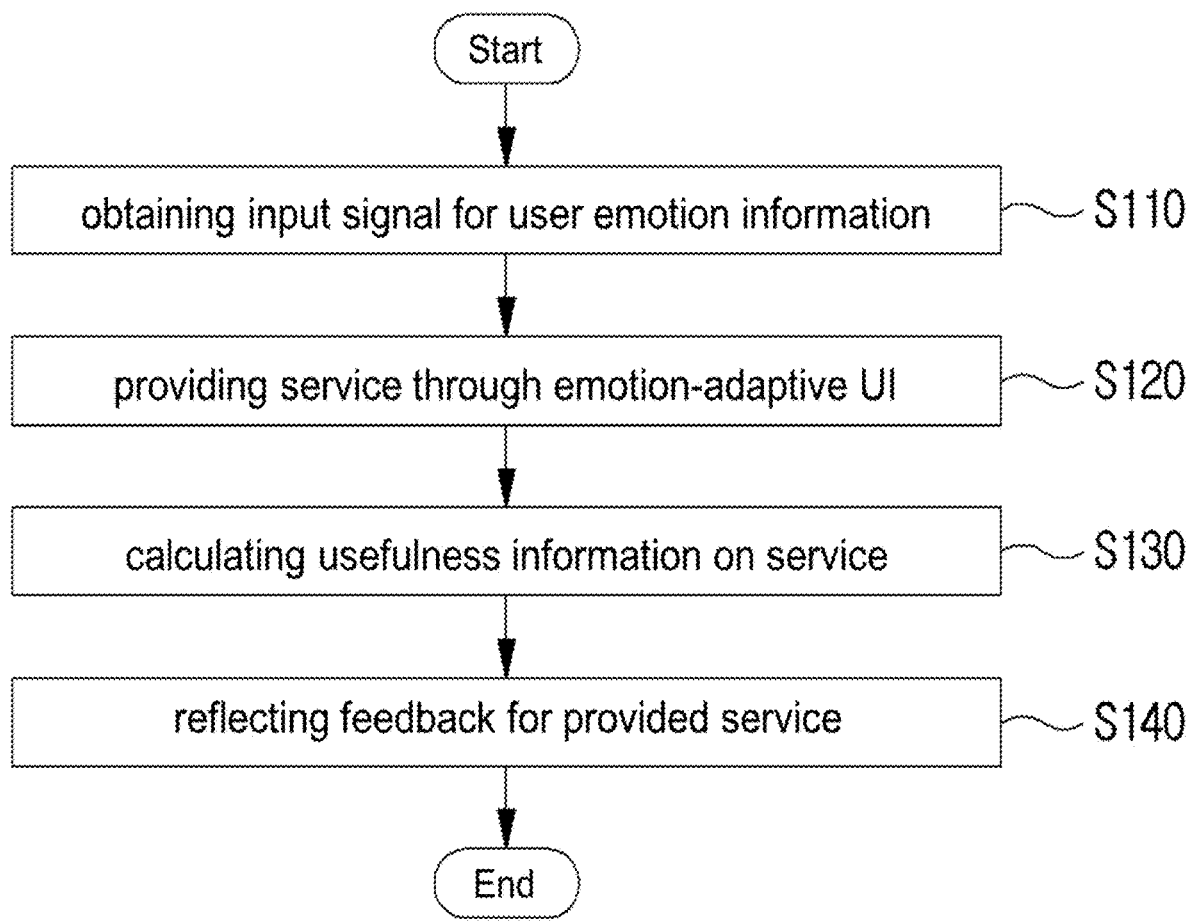
FIG. 1 is a flowchart illustrating a method of providing an emotion-adaptive user interface (UI) on the basis of affective computing according to an embodiment of the present invention.

Hereinbelow, exemplary embodiments of the present disclosure will be described in detail with reference to the accompanying drawings such that the disclosure can be easily embodied by one of ordinary skill in the art to which this disclosure belongs. However, the present disclosure is not limited to the exemplary embodiments.

In describing embodiments of the present disclosure, it is noted that when the detailed description of known configurations or functions related to the present disclosure may make the gist of the present disclosure unclear, the detailed description thereof will be omitted. Also, portions that are not related to the present disclosure are omitted in the drawings, and like reference numerals designate like elements.

In the present disclosure, when an element is "coupled to", "combined with", or "connected to" another element, it can be directly coupled to the other element or intervening elements may be present therebetween. Also, when a constituent "comprises" or "includes" an element, unless specifically described, the constituent does not exclude other elements but may further include the elements.

In the present disclosure, the terms "first", "second", etc. are only used to distinguish one element from another element. Unless specifically stated otherwise, the terms do not denote an order or importance. Thus, without departing from the scope of the present disclosure, a first element of an embodiment could be termed a second element of another embodiment. Similarly, a second element of an embodiment could also be termed a first element of another embodiment.

In the present disclosure, elements that are distinguished from each other to clearly describe each feature do not necessarily denote that the elements are separated. That is, a plurality of elements may be integrated into one hardware or software unit, or one element may be distributed into a plurality of hardware or software units. Accordingly, even if not mentioned, the integrated or distributed embodiments are included in the scope of the present disclosure.

In the present disclosure, elements described in various embodiments do not denote essential elements, and some of the elements may be optional. Accordingly, an embodiment that includes a subset of elements described in another embodiment is included in the scope of the present disclosure. Also, an embodiment that includes the elements which are described in the various embodiments and additional other elements is included in the scope of the present disclosure.

Hereinafter, the embodiments of the present disclosure will be described with reference to the accompanying drawings.

The present invention relates to a method and apparatus for providing an emotion-adaptive UI for an affective computing service. More specifically, the present invention relates to a method of providing a UI that adapts to the user's emotion and an apparatus therefor, in which usefulness information dynamically calculated in a service process for the UI is extracted on the basis of recognized emotion information, and the existing user experience UX information including the corresponding usefulness information for the corresponding UI is utilized.

In various affective computing services that actively improve the quality of user's physical and mental health, the emotion-adaptive UI should operate according to the purpose intended to be ultimately provided to the user by the service.

The emotion-adaptive UI according to the present invention may operate in accordance with the purpose of various emotion services. In the present invention, the emotion-adaptive UI may be also referred to as the emotion-adaptive UI.

For the operation of the present invention, detailed patterns of the emotion-adaptive UI may be dynamically adjusted on the basis of user emotion information, emotion service purpose information, and user experience (UX) information. Herein, the user emotion information may correspond to the information recognized on the basis of bio-signal, voice, and video data of the user. The user experience information may include user's usefulness information on the emotion-adaptive UI. Herein, the user's usefulness information included in the user experience information may correspond to the evaluation index for the emotion-adaptive UI when the emotion-adaptive UI was operated previously.

Emotion information recognized from user experience data includes a specific emotion label such as sadness, joy, and anger, and various sensitivity labels such as neutral, awake, relaxed, and extremely relaxed (e.g. asleep), positive state, and negative state, describing the user's biorhythm and emotions.

The purpose of the various emotion services according to the present invention may include emotion awakening, emotion control, emotion consolation, and the like.

The purpose of the emotion awakening is to change the detailed pattern of the emotion-adaptive UI according to the periodically recognized biorhythm state and emotion information, thereby helping the user reach the awake.

The purpose of emotion control is to help a user to properly recognize and control his/her emotions for a user-specific emotion state.

The purpose of emotion consolation is to provide the emotional comfort to the user by changing the detailed pattern of the emotion-adaptive UI according to the user's bio-signals and emotions.

The emotion-adaptive UI is operated in such a manner to change the pattern of the emotion-adaptive UI on the basis of the purpose information of such an emotion service.

However, the present invention is not limited to the above-mentioned purposes, and the above purposes may correspond to the purpose information that may be fundamentally set in the present apparatus.

Also, the user may set the purpose information according to an embodiment of the present invention.

The emotion-adaptive UI is operated in such a manner to dynamically change the emotion-adaptive UI pattern in a manner to satisfy the purpose of the service.

In addition, the emotion-adaptive UI of the present invention extracts the usefulness information of the corresponding UI dynamically calculated in the service process on the basis of the service purpose information and the recognized emotion information, and uses the user experience information on the extracted usefulness information to change the pattern of the emotion-adaptive UI.

Hereinafter, embodiments of the present invention will be described with reference to the accompanying drawings. The present invention will be described in detail with reference to the portions necessary for understanding the operation according to the present invention.

FIG. 1 is a flowchart illustrating a method of providing an emotion-adaptive user interface (UI) based on affective computing according to an embodiment of the present invention.

Although there are many technologies aimed at providing (recommending) a suitable service according to emotion in the related art, a method of reaching the service purpose with maximum efficiency is disclosed according to the present invention. In this case, the service purpose may be classified into a default service purpose set fundamentally and a purpose defined by a user.

Herein, the present invention adjusts the detailed pattern of the registered emotion-adaptive UI, in which the detailed pattern is adjusted by calculating the usefulness according to variance information (experience) of the user's emotion state.

In addition, the present invention may extract reaction information from the emotion-adaptive UI. Herein, the extracted reaction information is stored as experience information of the emotion-adaptive UI, and thus referenced when setting the initial value for the next operation of the corresponding emotion-adaptive UI.

The apparatus for providing the emotion-adaptive UI may first obtain an input signal for the user emotion information (S110).

Herein, the input signal to the user emotion information may include at least one of bio-signal data, voice data, and video data of the user. Also, the emotion information may be recognized on the basis of the input signal using an emotion recognition model according to an embodiment of the present invention.

The apparatus may then provide the service based on the emotion information through the emotion-adaptive UI (S120).

According to the present invention, a service provided through the emotion-adaptive UI includes at least one of a service operation condition, a service end condition, and an emotion-adaptive UI service type on the basis of the service purpose information.

Herein, the service operation condition and the service end condition include at least one of a time information for operating the service, current emotion information, target emotion information, and place information.

According to the present invention, the emotion-adaptive UI service type may include a sound service, a display service, a vibration service, and a tactile service. However, the present invention is not limited thereto. Herein, the service provided through the emotion-adaptive UI may be provided with at least one of a sound service, a display service, a vibration service, and a tactile service.

According to the present invention, the emotion-adaptive UI service type may be configured with one or more detailed patterns. Herein, the detailed pattern may correspond to the detailed attribute for the emotion-adaptive UI service type. The detailed pattern may also correspond to a method of controlling the emotion-adaptive UI service type.

When the service is provided according to an embodiment of the present invention, the detailed pattern may be changed and provided on the basis of at least one of user's experience information including the purpose information and usefulness information of the service.

When the service is provided according to an embodiment of the present invention, the detailed patterns included in the service may be changed in a manner to satisfy the service purpose information, on the basis of the service purpose information.

The provided service is provided so that the detailed pattern thereof may be modified in the direction that satisfies the service purpose information. In this case, according to the result of providing the service having the detailed pattern, when the usefulness calculated for the detailed pattern is equal to or larger than the threshold value, it may be determined that the service purpose information is satisfied. Herein, the threshold value may correspond to the designated value of the user.

When the service is provided according to an embodiment of the present invention, information corresponding to the service purpose information among the user experience information is checked, and the detailed pattern included in the service may be determined on the basis of the usefulness information included in the corresponding information.

The apparatus may then calculate the usefulness information for the service (S130).

According to the present invention, the usefulness information may correspond to the evaluation index for the service provided through the emotion-adaptive UI and mean information that is determined on the basis of the service purpose information. Herein, the usefulness information may include service usefulness information and detailed pattern usefulness information.

The service usefulness information of the usefulness information may be calculated on the basis of at least one of the emotion information at the start of the detailed pattern of the service, the emotion information at the end of the detailed pattern of the service, and the service purpose information.

The detailed pattern usefulness information of the usefulness information may be calculated on the basis of at least one of difference between the emotion information at the start of the detailed pattern and the emotion information at the end of the detailed pattern, and the service purpose information.

Finally, the apparatus may perform feedback based on usefulness information for the provided services, and may reflect the feedback to the operation of the emotion-adaptive UI (S140).

When the feedback is reflected in the operation of the emotion-adaptive UI based on the usefulness information is reflected on the provided service according to an embodiment of the present invention, the information on the detailed pattern for the provided service may be updated.

Specific details of the operation and configuration of the present invention will be described referring to the following drawings.

Figure 2:
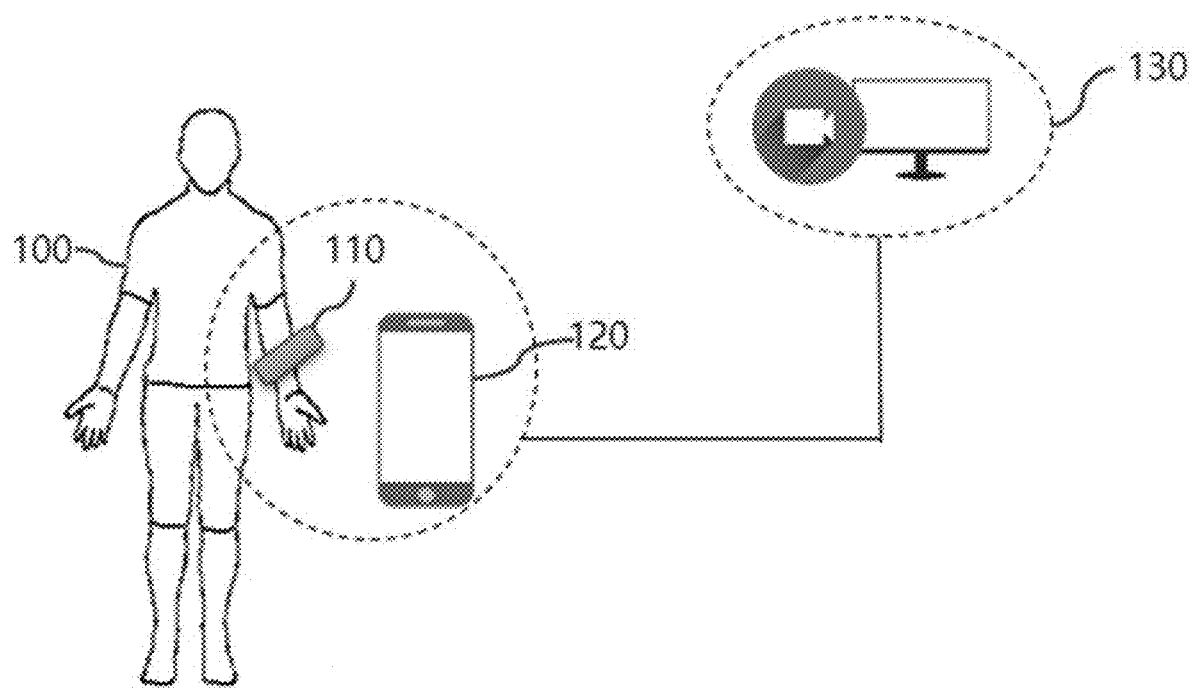
FIG. 2 is a diagram illustrating a configuration of a service system in which the service is operated according to an embodiment of the present invention.

FIG. 2 is a diagram illustrating a configuration of a service system in which the service is operated according to an embodiment of the present invention.

The service system in which the service operates according to an embodiment of the present invention may include a user-wearable device 110, a user portable device 120, and an Internet of Things peripheral 130.

Herein, the bio-signal and audio/video data of the user 100 used for recognizing the user's emotion may be collected through the user-wearable device 110, the user portable device 120, and the Internet of Things peripheral 130.

The user experience data and recognized emotion information collected from these devices may be exchanged through the inter-device communication method. An emotion-adaptive UI module that operates on the basis of the exchanged user experience data and recognized emotion information may also be implemented in each apparatus.

The collected bio-signals may include data such as heart rate (HR), heart rate variation (HRV) calculated through the heart rate information, galvanic skin response (GSR), photoplethysmogram (PPG), and the like, but the present invention is not limited thereto.

Operations (start and end) of the user-wearable device 110, the user portable device 120, and the Internet of Things peripheral 130 may be determined on the basis of the emotion information recognized through the user experience data.

In more detail, the emotion information may be recognized through the user experience data collected in the user-wearable device 110, the user portable device 120, and the Internet of Things peripheral 130. In addition, the start and end of the emotion-adaptive UI operation state in which the emotion-adaptive UI operates may be determined through a combination of other attribute such as the time for the emotion-adaptive UI operation state. In addition, the emotion-adaptive UI registered by the user may be executed.

Herein, the emotion-adaptive UI operation may be terminated when the emotion-adaptive UI operation state has reached the designated time or the variance in the emotion state, or an explicit end interface occurs from the designated user through the user-wearable device or the portable device.

Figure 3:
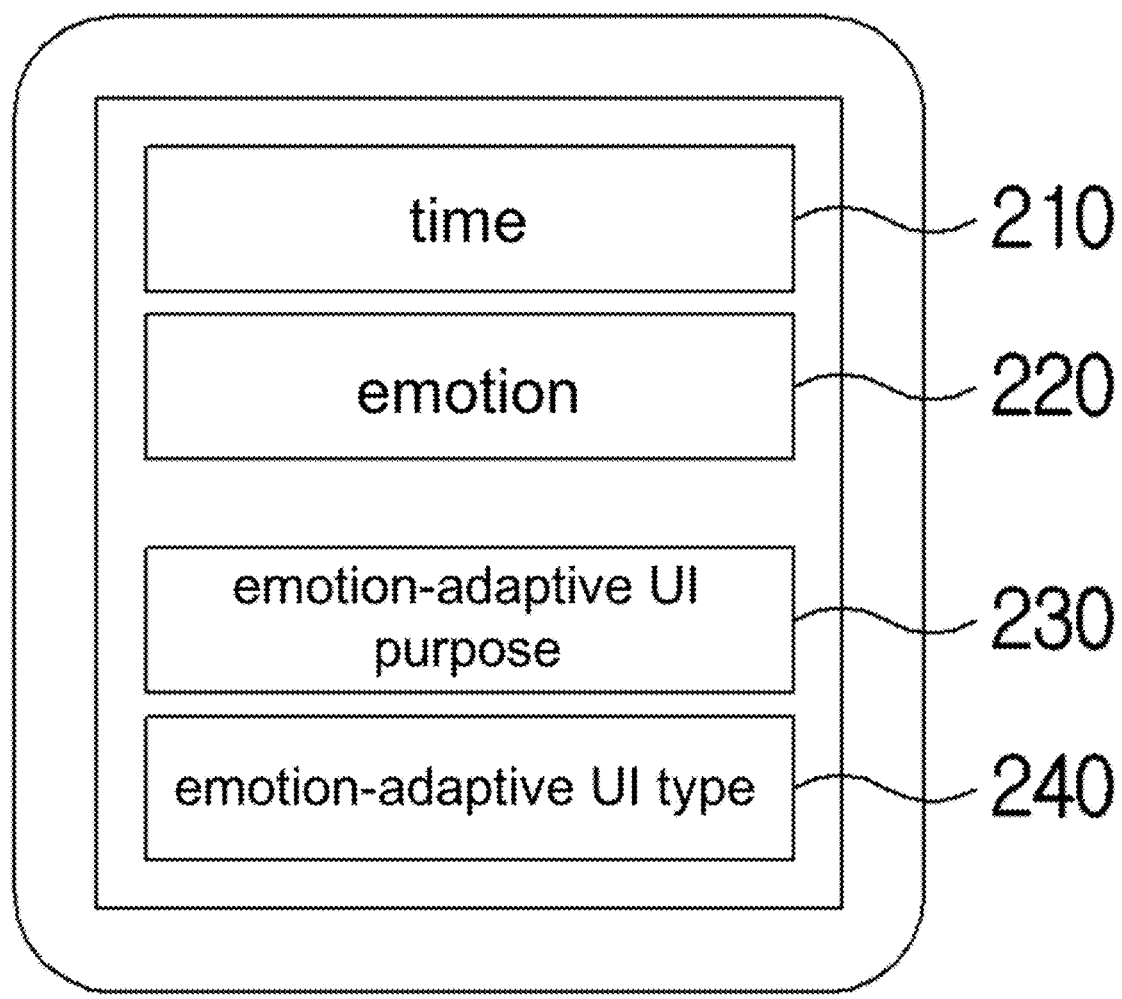
FIG. 3 is a diagram illustrating an attribute configuration of an emotion-adaptive UI according to an embodiment of the present invention.

FIG. 3 shows an attribute configuration of an emotion-adaptive UI according to an embodiment of the present invention.

The service of the present invention may include at least one of a service operation condition, a service end condition, and an emotion-adaptive UI service type on the basis of the service purpose information.

According to an embodiment of the present invention, the service operation condition and the service end condition may correspond to attributes implemented in FIG. 3, and a combination of the attributes implemented in FIG. 3 may be specified. However, the attributes implemented in FIG. 3 may correspond to an embodiment of the present invention.

In the present invention, an attribute may correspond to a property or attribute of the service, and correspond to elements constituting the service. Further, the attribute may correspond to the information in the present invention. For example, the time attribute may correspond to time information, and the emotion attribute may correspond to emotion information.

The service purpose information according to the present invention may correspond to the emotion-adaptive UI purpose 230 of FIG. 3. In the present invention, the service purpose information may correspond to the information reflecting the purpose of providing the service to the user. In the present invention, the service purpose information may correspond to a word having the same meaning as the service purpose or the emotion-adaptive UI purpose. According to one embodiment of the present invention, the service purpose information may correspond to information reflecting the purpose of emotional awakening, emotional control, and consolation.

The emotion-adaptive UI service type of the present invention may correspond to the emotion-adaptive UI type 240 of FIG. 3. In the present invention, emotion-adaptive UI type, the emotion-adaptive UI service type may correspond to a word having the same meaning as emotion-adaptive UI type the emotion-adaptive UI, emotion-adaptive UI type attribute or the feedback type attribute.

In order to provide the UI according to the present invention, the user may set the service purpose information 230, the service operation condition, the end condition of the service, and the emotion-adaptive UI service type 240 according to an embodiment of the present invention. In addition, according to an embodiment of the present invention, the user may use the services preset for service purpose information, service operation condition, service end condition, and emotion-adaptive UI service type.

A combination of several or more attributes may be represented in the service operation condition and the service end condition.

According to an embodiment of the present invention, the service operation conditions for operating the service correspond to conditions set on the basis of a time information 210 for operating the service, current emotion information and target emotion information 220, place information, and the like.

According to an embodiment of the present invention, the service end conditions correspond to conditions set on the basis of the time information 210 for operating the service, the current emotion information and target emotion information 220, and the place information.

Therefore, the attributes of FIG. 3 may correspond to an example of the present invention. When the emotion-adaptive UI of the present invention is implemented in the system, types and values of attributes of the UI that may be designated to be suitable for each service are not limited. In addition, a variety of UIs capable of being specified to suit each service may be set.

As the time information 210 of the emotion-adaptive UI operational state, a range of absolute time based on the world standard time or a semantic attribute, such as "morning", "lunch", or "evening" may be specified.

The emotion information 220 of the emotion-adaptive UI operation state may be a specific emotion label, such as sadness, joy, and anger. In addition, as the emotion information 220, various sensitivity labels such as neutral, awake, relaxed, and extremely relaxed (e.g. asleep), positive, and negative, describing the user's biorhythm and emotion may be specified.

Table 1 shows kinds of purposes, types and detail pattern attributes of the emotion-adaptive UI.

According to an embodiment of the present invention, as shown in Table 1 below, as the attribute of the emotion-adaptive UI purpose 230, the purpose such as awakening, emotion control, and emotion consolation may be specified.

The optimal UI type pattern attribute according to the user's emotion state is determined and operated in a manner to reach the purpose designated according to the attribute of the specified emotion-adaptive UI purpose 230.

TABLE 1

| Emotion-adaptive UI purpose attribute | Emotion-adaptive UI type attribute | Detailed pattern attribute |
|---|---|---|
| Awakening Emotion control Emotion consolation | Sound | Type of sound, Sound interval |
| | Display | Color, Text, Icon |
| | Vibration | Type of vibration, Vibration interval |
| | Tactile | Up/down/left/right/ other tactile pattern, Intensity |

The attribute of the emotion-adaptive UI purpose 230 may be used as an attribute for determining a change in the detailed pattern of the emotion-adaptive UI that is operated and, more specifically used as information for calculating the usefulness of the emotion-adaptive UI and the detailed patterns in order to determine a change in the detailed pattern when executing the emotion-adaptive UI.

The emotion-adaptive UI of the present invention may be operated so as to be varied according to the direction and emotion state that is suitable for the purpose attribute specified in the corresponding emotion-adaptive UI through the calculated usefulness information.

In the case where the default purpose information is selected as the purpose information 230 of the service according to an embodiment of the present invention, the default purpose information includes an emotion awakening purpose, an emotion control purpose, and emotion consolation purpose.

When registering a UI for three default service purposes, the detailed patterns that fundamentally operate may be set automatically at the beginning. Also, when registering the UI for the default service purposes, the direction in which the detailed pattern should be adjusted may be automatically set at the beginning.

According to an embodiment of the present invention, a situation may be assumed in which an emotion service having emotion control purpose is provided in a user terminal. From the provided service, the emotion control purpose may be automatically set as the purpose of the emotion-adaptive UI according to the present invention. In addition, an operation mode such as vibration, tactile, and sound may be arbitrarily set by the user through the UI. When the corresponding service is activated, the user is provided with an emotion-adaptive UI that varies according to his/her body rhythm, emotion state, and emotion intensity, so that the user may accurately recognize his/her emotion state and thus try to control the emotion state.

As an embodiment according to the present invention, an emotion-adaptive UI that operates with the emotion consolation purpose may be assumed. This case may operate differently from the UI pattern for emotion control purpose, which provides a linear UI pattern for the recognized emotion state and emotion intensity. In the case of the emotion-adaptive UI that operates with the emotion consolation purpose as an embodiment, the UI pattern may be varied to provide psychological stability to the user when the user's negative emotion is recognized.

In addition, new purpose information may also be defined by the user for the service purpose information 230. Herein, for the service purpose information 230 set by the user, the user may generate the service provided by selecting at least one of service operation condition, service end condition, and emotion-adaptive UI service type.

Herein, the user may specify the start conditions of the UI having the service purpose defined by the user, for example, the start emotion information 220 and the start time information 210, and the like.

Also, the user may set the end condition of the emotion-adaptive UI, such as, for example, user emotion information 220, end time information 210, etc. at the time of end.

Also, the user may set the emotion-adaptive UI type 240, for example, operation mode of the device, such as vibration and sound. Accordingly, the emotion-adaptive UI may be operated in a manner to be specified for the service purpose specified by the user.

When measuring the usefulness for the user registration service UI, the desired service target vector of the required service purpose may be determined on the basis of the emotion attribute value of the registered start condition and the emotion attribute value of the end condition.

When the user designates the purpose information of the emotion-adaptive UI, according to an embodiment of the present invention, the user may register the vibration emotion-adaptive UI to alleviate the emotion for the environment in which a specific fear is felt.

More specifically, according to an embodiment of the present invention, a company may be selected as a "place attribute" of the operation start conditions of the emotion-adaptive UI may be selected. In addition, fear may be selected as an "emotion attribute" of the operation start conditions of the emotion-adaptive UI.

As an "emotion attribute" of the end conditions of the emotion-adaptive UI, an awakening degree of a low state is designated. In addition, the "purpose" of the corresponding service is set to alleviate the fear.

The emotion-adaptive UI type 240 includes sound, display, vibration, tactile, etc., each having detailed pattern attributes. However, the present invention is not limited thereto.

According to an embodiment of the present invention, the service provided through the emotion-adaptive UI may include at least one of a sound service, a display service, a vibration service, and a tactile service. In other words, a combination of one or more types (for example, vibration and tactile) may be provided as the emotion-adaptive UI type according to the conditions set for the service. Also, only one type may be provided as the emotion-adaptive UI type, depending on the conditions set for the service.

In this case, the detailed pattern corresponds to the detailed attribute for the emotion-adaptive UI service type 240. The detail pattern also corresponds to a method of controlling the emotion-adaptive UI service type.

In the present invention, the emotion-adaptive UI attribute may be explicitly registered by the user according to an embodiment of the present invention. The emotion-adaptive UI attributes may also be determined automatically in the processes of various affective computing services.

Each attribute element of the emotion-adaptive UI operation state may be specified in the form of a conditional combination (AND, OR, etc.) when all the conditions specified in the attribute are met or only a specific condition is met. That is, according to an embodiment of the present invention, conditions are specified for each of the time information and the emotion attribute, and the specified conditions are set so that the conditional combination is satisfied.

First, when the emotion-adaptive UI is explicitly designated by the user, the user may designate the occurrence time information 210 and the user emotion information 220 of the emotion-adaptive UI operation state through the user-wearable device and the portable device.

As an example of setting the attributes of the emotion-adaptive UI operation state according to an embodiment of the present invention, when a user wants to register the emotion-adaptive UI having the purpose of reaching his/her emotion state at the sensibility of the "awakening state" in the morning, the user may set the emotion-adaptive UI operation state as emotion state of "extremely relaxed state" at the time of "7 a.m.". That is, the user may set "awakening state" as the emotion-adaptive UI purpose 230, "7 a.m." as the time information 210, and "extremely relaxed state" as the emotion information 220. Also, the user may set "awakening state" as the emotion-adaptive UI purpose 230 and "vibration" as the emotion-adaptive UI type 240.

Also, when the emotion-adaptive UI of the present invention is implemented, emotion-adaptive UI operation state and the emotion-adaptive UI attribute may be automatically set at the processes of various affective computing services.

An emotion-adaptive UI provided during the user's driving of the vehicle may be applied according to an embodiment of the present invention. This case may require a user agreement on providing the emotion-adaptive UI in the navigation service during the driving. When the "extremely relaxed state" is detected as the emotion information 220 during the user's driving of the vehicle, the emotion-adaptive UI for changing the user's emotion state to the "awakening state" is provided. Herein, the emotion-adaptive UI purpose 230 may correspond to the "awakening". In addition, the feedback type attribute 240 may be automatically assigned "sound", "vibration", "tactile", or the like.

According to an embodiment of the present invention, some of the emotion-adaptive UI attributes may be designated automatically through interworking with the service, and some may be designated by explicit registration by the user.

Also, in accordance with an embodiment of the present invention, the emotion-adaptive UI may operate on the basis of the emotion-adaptive UI purpose 230.

Figure 4:
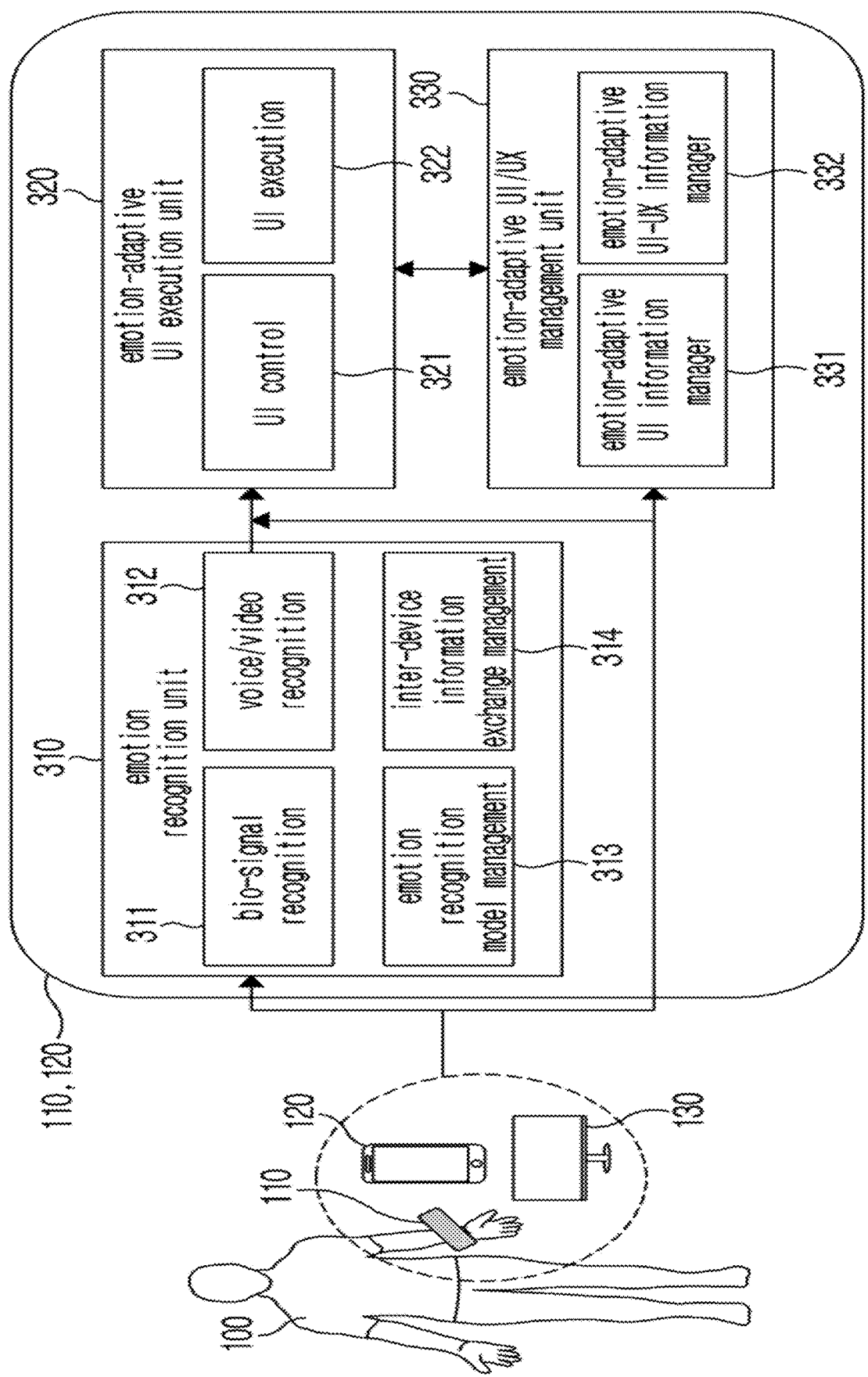
FIG. 4 is a diagram illustrating a functional block structure of the emotion-adaptive UI performed in a wearable device or a portable device according to the present invention.

FIG. 4 is a diagram illustrating a functional block structure of the emotion-adaptive UI performed in a wearable device or a portable device according to the present invention.

The present invention includes an emotion recognition unit 310, an emotion-adaptive UI execution unit 320, and an emotion-adaptive UI/UX management unit 330.

A bio-signal recognition block 311 of the emotion recognition unit 310 may collect bio-signals of the user 100 and process the bio-signals into information for emotion recognition.

A voice/video recognition block 312 of the emotion recognition unit 310 may extract information for emotion recognition from the voice/video data of the user.

An emotion recognition model management block 313 may recognize a user's emotion state on the basis of the emotion recognition model and the extracted emotion recognition information.

The user-wearable device 110, the user portable device 120, and the IoT peripheral device 130 may exchange the user experience data and the recognized emotion information with each other. Herein, an inter-device information exchange management block 314 may be included for the purpose of information exchange.

The user emotion information recognized from the emotion recognition unit 310 may be transmitted to the emotion-adaptive UI execution unit 320. Herein, the emotion-adaptive UI execution unit 320 is provided so that the registered emotion-adaptive UI changes the pattern attribute according to the designated purpose. The emotion-adaptive UI execution unit 320 may include a UI control unit 321 and a UI execution unit 322.

The UI control unit 321 receives user emotion information from the emotion recognition unit 310. Also, the UI control unit 321 may receive the end interface information for the emotion-adaptive UI from the user. In addition, the UI control unit 321 may perform interworking with the emotion-adaptive UI/UX management unit 330.

That is, the UI control unit 321 may determine the start and end points of the emotion-adaptive UI on the basis of the input user emotion information and end interface information, and the information transmitted by the emotion-adaptive UI/UX information management unit. In addition, the UI control unit 321 is provided so that the detailed pattern attributes of the corresponding emotion-adaptive UI is controlled to cause the detailed pattern attributes to be executed.

In this case, when adjusting the detailed pattern attribute of the emotion-adaptive UI, the detailed pattern attribute may be adjusted on the basis of the usefulness information and the information provided in the user experience information descriptor (UI-UX descriptor). Herein, the usefulness information corresponds to the information calculated on the basis of the emotion state recognition information which varies in the process of providing the service. Also, the user experience information descriptor (UI-UX descriptor) is information including usefulness information in the past, and corresponds to information on the corresponding UI managed by the emotion-adaptive UI-UX information manager 332.

The emotion-adaptive UI-UX management unit 330 may include an emotion-adaptive UI information manager 331 and an emotion-adaptive UI-UX information manager 332.

The emotion-adaptive UI information manager 331 may manage the attribute information of the registered emotion-adaptive UI.

The emotion-adaptive UI-UX information manager 332 may manage the user experience information descriptor including the usefulness information on operations of the emotion-adaptive UI.

In this case, the UI attribute information, the recognized emotion information, the detailed UI pattern attributes performed in the recognized emotion state, and the usefulness measurement values of the corresponding patterns are stored as the user experience information of the corresponding emotion-adaptive UI in the user experience information UX descriptor.

As an example of the emotion-adaptive UI operation of the present invention, the initial pattern attribute of the emotion-adaptive UI may be determined and provided. According to an embodiment of the present invention, the information provided in the user experience information descriptor for the UI that was operated in the past may be utilized. That is, when the user experience information descriptor shows the corresponding emotion information on the basis of the user emotion information recognized when a specific UI is operated, the UI pattern attribute that showed the high usefulness in the past is determined so that the initial emotion-adaptive UI may be performed with the corresponding pattern. Herein, the experience information descriptor is used to calculate and store the usefulness information reflecting whether the emotion information recognized at the time of start and end of the detailed pattern of the emotion-adaptive UI matches the purpose of the emotion-adaptive UI.

The emotion-adaptive UI of the present invention adapts to the user's emotion information based on the bio-signals and voice information of the user and thus changes the attribute of the detailed pattern of the corresponding UI. To do this, when the corresponding emotion-adaptive UI is operated, the usefulness of the UI and the usefulness of the detailed patterns constituting the UI are calculated and managed as user experience information. The detailed pattern of the UI is adjusted with reference to the experience information stored in the past.

Figure 5:
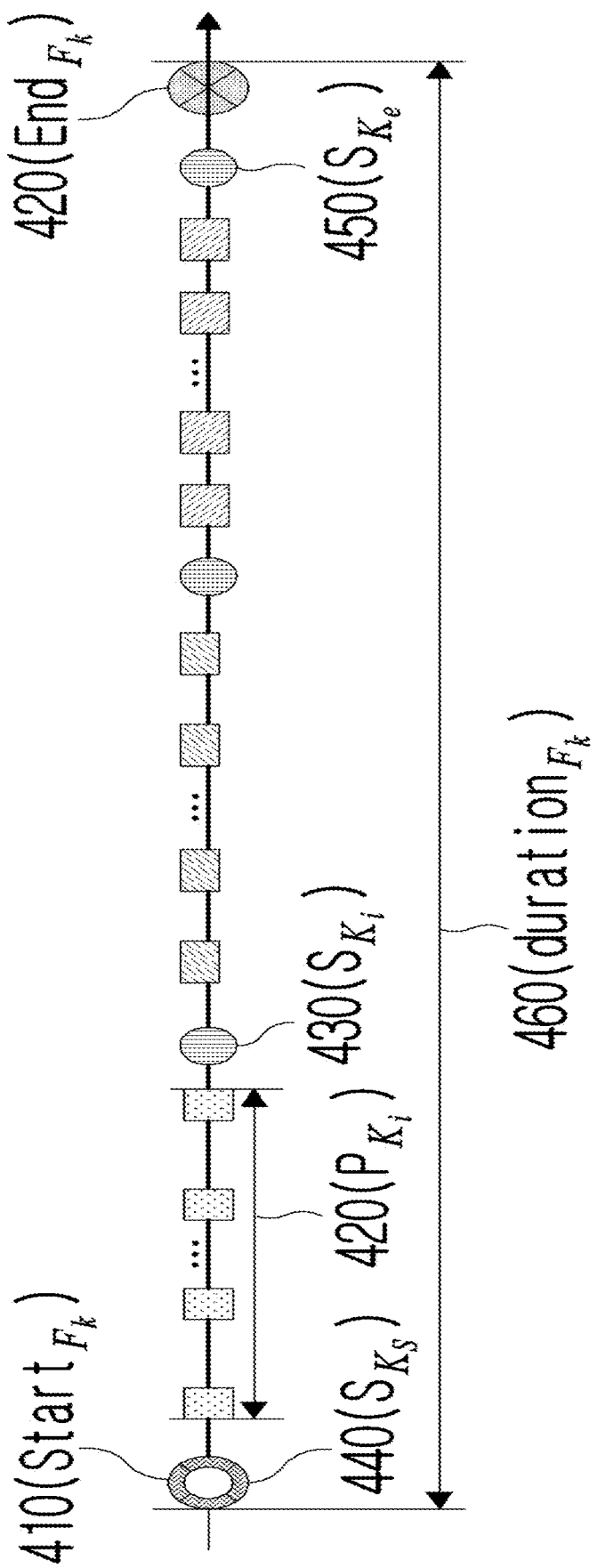
FIG. 5 is a diagram illustrating operations of an emotion-adaptive UI pattern according to an embodiment of the present invention.

FIG. 5 is a diagram illustrating operations of an emotion-adaptive UI pattern according to an embodiment of the present invention.

FIG. 5 illustrates an operation for extracting the usefulness for a specific k-th emotion-adaptive UI $F_k$ in the emotion-adaptive UI-UX information management block and the usefulness information of the i-th detailed pattern $P_{k_i}$ 420 of the corresponding UI $F_k$.

Emotion information $S_{k_i}$ 430 recognized at the time of start and end of the i-th detailed pattern $P_{k_i}$ of the UI($F_k$), emotion information 440 and 450 recognized at the start point in time $start_{F_k}$ 410 and end point in time $End_{F_k}$ 420 of the corresponding UI $F_k$, and the duration time $duration_{K_s}$ 466 from the start until the end of the corresponding UI $F_k$ are schematized.

Equation 1 shows how to calculate the usefulness $Usefulness_{F_k}$ of a particular emotion-adaptive UI $F_k$. The usefulness $Usefulness_{F_k}$ of a particular emotion-adaptive UI $F_k$ of the present invention is determined by utilizing a variation $variation_{F_k}$ of user emotion information recognized at the time of start and end of the corresponding emotion-adaptive UI and an effect $effect_{F_k}$ on whether the operation is performed in accordance with the purpose which the user wants to achieve through the corresponding emotion-adaptive UI.

In addition, when calculating the usefulness of the emotion-adaptive UI, it is possible to utilize information on a total of operation time $duration_{F_k}$ from the start until the end of the corresponding UI.

The effect information $effect_{F_k}$ and the operation time information $duration_{F_k}$ used in calculating the usefulness of the corresponding emotion-adaptive UI may be determined using weight values $\omega_{F_k}^e$ and $\omega_{F_k}^t$ indicating the importance of each information according to the emotion-adaptive UI purpose. Herein, the weight values $\omega_{F_k}^e$ and $\omega_{F_k}^t$ may be explicitly specified according to the system implementation method according to the purpose of the emotion-adaptive UI, or may be designated as a result of learning according to the implemented service and operation.

The computed usefulness of the UI may be stored in the user experience information descriptor (UI-UX descriptor) and utilized in the service process. Equation 1 corresponds to an expression for calculating the usefulness of a specific UI $F_k$.

$$Usefulness_{F_k} = \omega_{F_k}^e * effect_{F_k} + \omega_{F_k}^{t*} duration_{F_k}$$

$$variation_{F_k} = \text{sensing variation between } S_{k_s} \text{ and } S_{k_e}$$

$$effect_{F_k} = \text{effect of } variation_{F_k} \quad \text{[Equation 1]}$$

Equation 2 corresponds to an expression for calculating the usefulness of a detailed pattern $P_{k_i}$ belonging to a specific UI $F_k$.

In the present invention, the usefulness $Usefulness_{P_{ki}}$ of the detailed pattern $P_{k_i}$ belonging to a specific UI $F_k$ is determined on the basis of the variation $variation_{F_{k_i}}$ of user emotion information recognized on the basis of the user biometric signal and voice/video data measured at the start and end of the emotion-adaptive UI pattern and the effect $effect_{F_k}$ on whether the operation is performed in accordance with the purpose which the user wants to achieve through the corresponding emotion-adaptive UI.

$$Usefulness_{P_{ki}} = effect_{P_{ki}}$$

$$variation_{P_{ki}} = \text{sensing variation between } S_{k_{i-1}} \text{ and } S_{k_i}$$

$$effect_{P_{ki}} = \text{effect of } variation_{P_{ki}} \quad \text{[Equation 2]}$$

Figure 6:
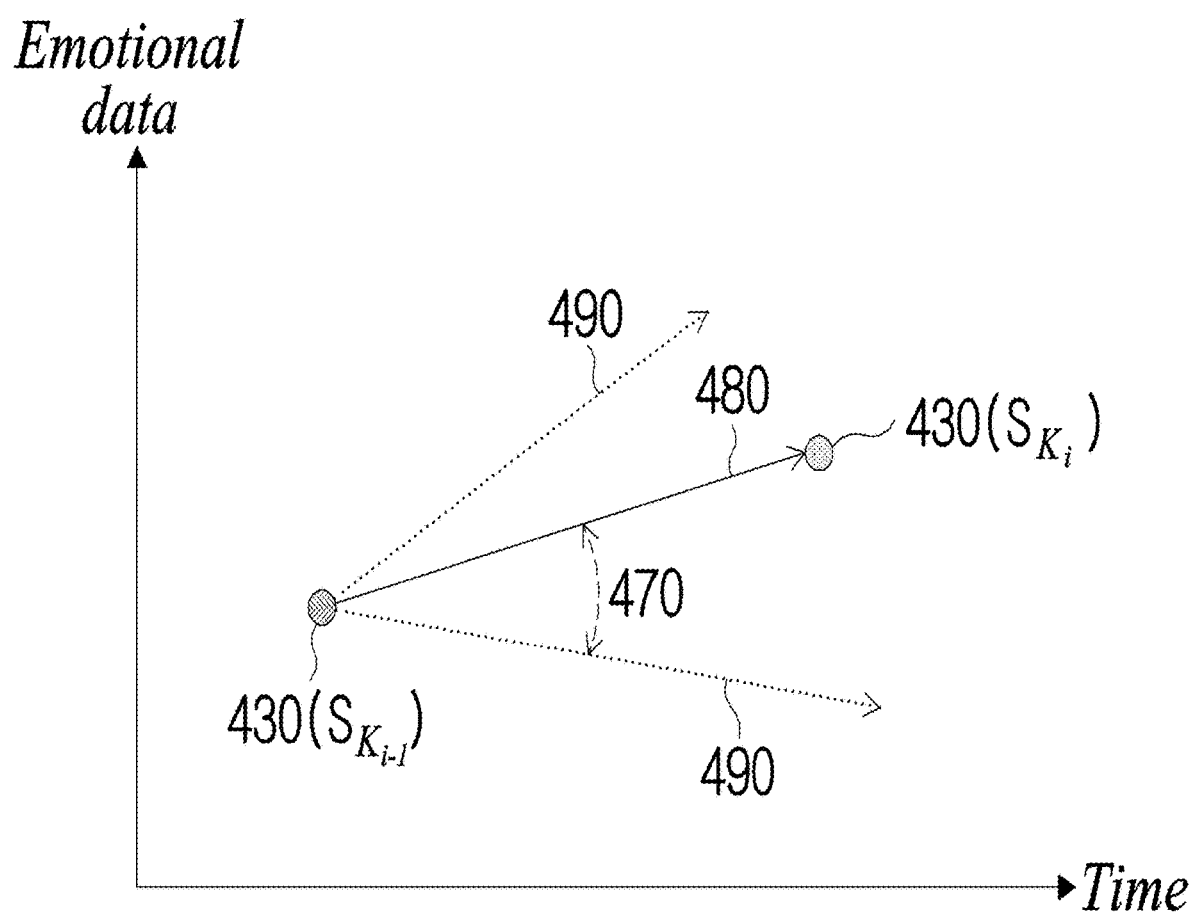
FIG. 6 is a diagram illustrating calculation of usefulness information on emotion variance to calculate the usefulness of an emotion-adaptive UI and detailed patterns.

FIG. 6 is a diagram illustrating calculation of usefulness information on emotion variance to calculate the usefulness of an emotion-adaptive UI and detailed pattern.

FIG. 6 is a diagram illustrating a method of calculating the effect information $effect_{F_k}$ and $effect_{P_{ki}}$ on whether the emotion-adaptive UI and the detail pattern conform to the purpose of the corresponding UI according to an embodiment of the present invention As shown in FIG. 6, it may be calculated by using the variance information 470 between the purpose vector 490 and the operation vector 480.

In this case, the operation vector may include the variance $variance_{P_{ki}}$ of the emotion information $S_{K_{i-1}}$ and $S_{K_i}$ 430 that are recognized during the operation.

Herein, the purpose vector may have a desirable degree of emotion variance corresponding to the purpose 230 of the corresponding emotion-adaptive UI.

The purpose vector and the operation vector may be dynamically generated on the basis of the emotion information measured at the start and end points of the interval in which the usefulness is to be measured within the emotion-adaptive UI operation interval.

As an example of the usefulness calculation of the present invention, a difference between the purpose vector and the operation vector is calculated by applying a method such as Euclidean distance calculation, cosine similarity, and the like, in which the closer the distance is to the purpose vector, the higher the usefulness is calculated. The desired variance direction and variance amount of the purpose vector of the emotion-adaptive UI may be designated explicitly by the service and the user depending on the system implementation method or by the learning result using data such as the user experience data.

Figure 7:
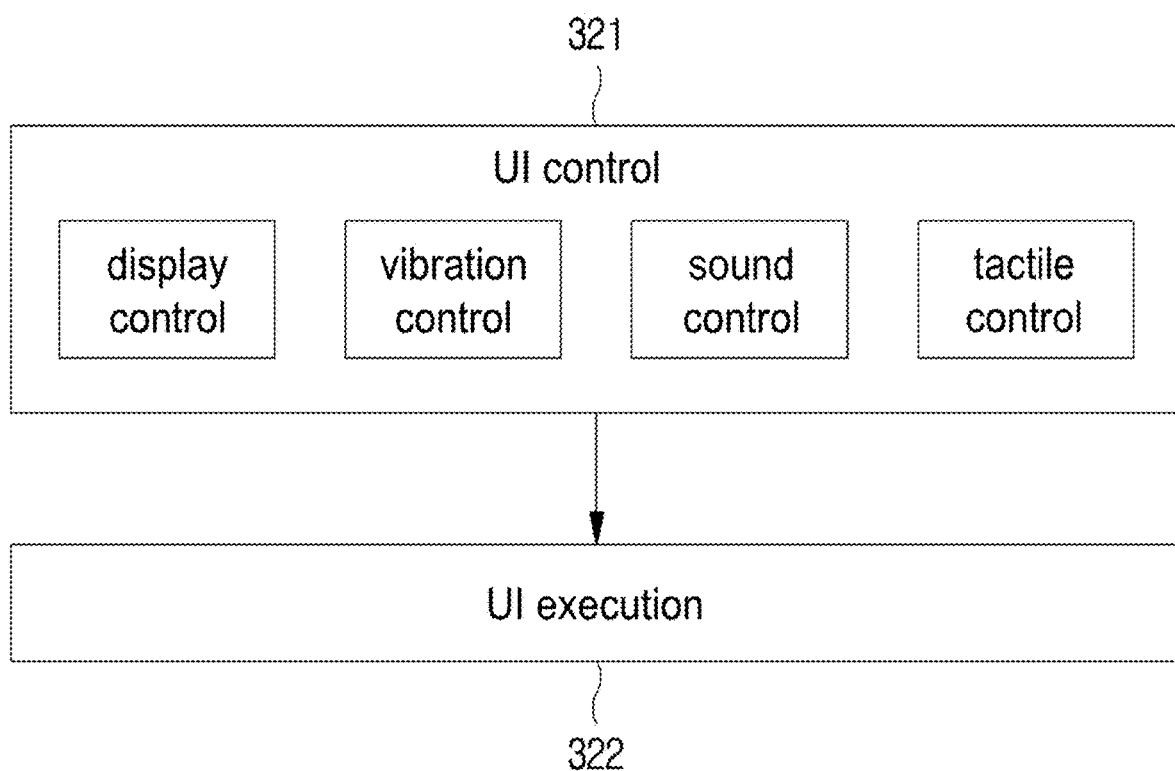
FIG. 7 is a block diagram illustrating an emotion-adaptive UI execution unit 320 according to the present invention.

FIG. 7 is a block diagram illustrating an emotion-adaptive UI execution unit 320 according to the present invention.

The emotion-adaptive UI execution unit 320 may include a UI controller 321 and a UI executor 322. The UI controller may include function modules for display control, vibration control, sound control, and tactile control of a user wearable device and a portable interface device.

Figure 8:
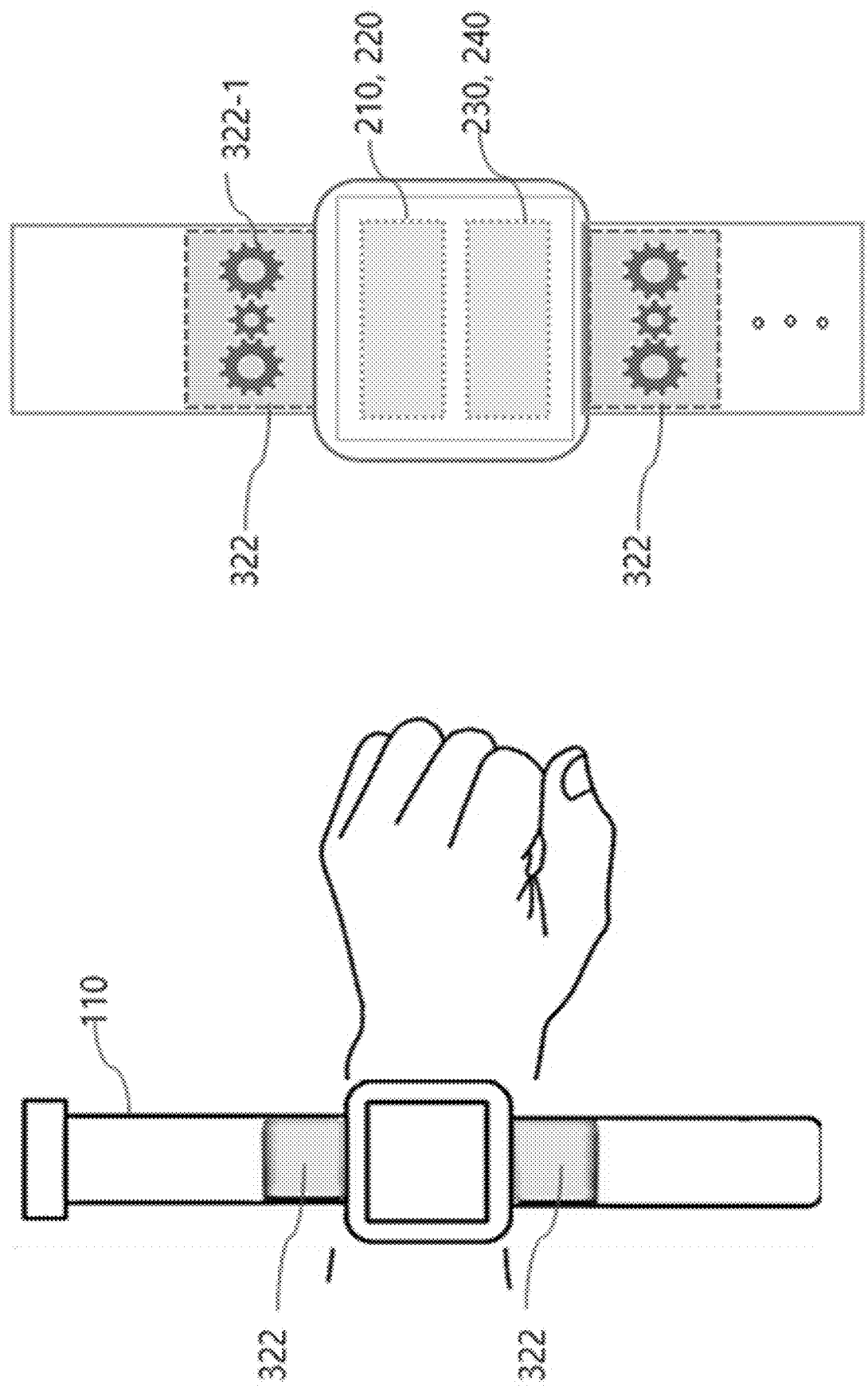
FIG. 8 is a diagram illustrating an embodiment of a wrist wearable device 110 that supports executing the emotion-adaptive UI according to the present invention.

FIG. 8 is a diagram illustrating an embodiment of a wrist wearable device 110 that supports executing the emotion-adaptive UI according to the present invention.

A wearable wrist device according to the present invention may include a bio-signal recognition module 311, and emotion-adaptive UI control and execution modules 321 and 322 such as display and vibration modules.

The service of the present invention may be configured with at least one of a service operation condition, a service end condition, and an emotion-adaptive UI service type on the basis of the purpose information of the service. Therefore, the user may register the configurations, or the above configurations may be automatically set by the provided service.

More specifically, time, sensitivity, emotion-adaptive UI purpose, and emotion-adaptive UI interface type for the emotion-adaptive UI operation state according to the present invention may be explicitly set through a user's registration through a wearable device or automatically set with interworking with driven services (210-240).

In addition, in the case of an apparatus providing a tactile type, the UI interface may include the module 322 for providing a tactile type UI of a hardware device 322-1 for providing tactile in up, down, left, right, and composite direction.

Figure 9:
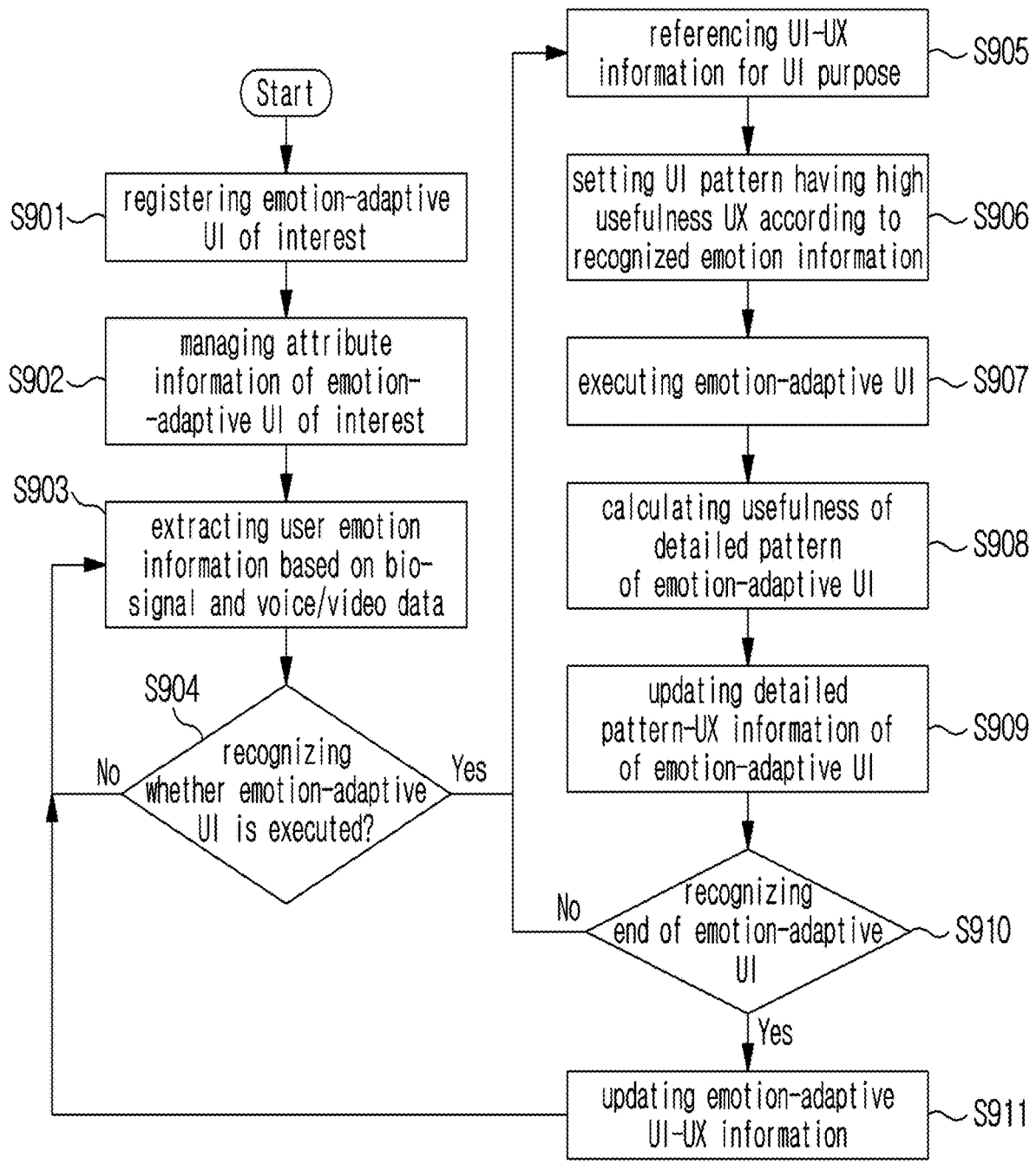
FIG. 9 is an operation flowchart illustrating an emotion-adaptive UI according to an embodiment of the present invention.

FIG. 9 is an operation flowchart illustrating an emotion-adaptive UI according to an embodiment of the present invention.

The user may register an emotion-adaptive UI of a specific emotion-adaptive UI operation state through a combination of conditions for time and emotion attributes of a specific emotion-adaptive UI operation state in which the emotion-adaptive UI operates (S901).

The system of the present invention may manage the attribute information of the emotion-adaptive UI registered by the user (S902).

The user emotion information may be recognized on the basis of the bio-signal and voice/video data of the user (S903).

The state recognition may be performed on whether the emotion-adaptive UI should be executed through the user emotion information and the context information such as time designated in the emotion-adaptive UI operation state (S904).

For the emotion-adaptive UI operation, the UI-UX descriptor information having the purpose of the emotion-adaptive UI may be referenced (S905).

In this case, it is possible to utilize the emotion-adaptive UI-UX information descriptor, in which the usefulness information on the UI pattern is managed for the purpose of the emotion service. The emotion-adaptive UI may be executed by referring to the detailed pattern information (S906) on the basis of the operation information of the UI, which shows the high usefulness in association with the emotion-adaptive UI-UX information descriptor, the recognized user biorhythm, and the emotion information (S907).

The usefulness information may be calculated in accordance with the emotion information extracted on the basis of the bio-signal and voice/video data of the user and the purpose type of the corresponding UI specified by the user (S908). The usefulness information of the emotion-adaptive UI-UX may be updated on the basis of the calculated usefulness information (S909).

The type of the pattern to be executed next may be determined using the calculated usefulness information of the detailed pattern and the information stored in the UI-UX descriptor (S906).

Further, in adjusting the detailed pattern of the emotion-adaptive UI, it is determined whether the usefulness value is equal to or greater than a threshold value. In this case, when the usefulness calculated for the pattern that was previously executed is equal to or higher than a threshold value and thus is operated in accordance with the purpose of the emotion-adaptive UI, the corresponding pattern may be maintained to be executed (S907).

The usefulness information Usefulness$_{P_i}$ may be stored in the emotion-adaptive UI-UX descriptor (S909). In this case, the usefulness information Usefulness$_{P_i}$ may be calculated by reflecting whether the emotion information recognized at the time of start and end of the detailed pattern of the emotion-adaptive UI conforms to the purpose of the emotion-adaptive UI.

The end of the emotion-adaptive UI may be recognized in accordance with an explicit user expression as a specific word such as "stop", an explicit interface such as a button, the time designated in the corresponding emotion-adaptive UI operation state, and a case where the user emotion is changed to the purpose emotion designated in the corresponding UI (S910).

When it is recognized that the emotion-adaptive UI is terminated, the emotion-adaptive UI-UX information management function block extracts and updates the usefulness information for the corresponding emotion-adaptive UI (S911).

The present invention relates to a method of providing an emotion-adaptive UI, including a method in which an operation purpose for an emotion-adaptive UI is designated from the user and the service, a method of measuring the usefulness of the emotion-adaptive UI and the detailed pattern on the basis of the purpose information of the emotion-adaptive UI at the process of executing the emotion-adaptive UI, a method of storing the user experience information on the usefulness of the detailed pattern at the process of executing the emotion-adaptive UI, and a method of adjusting the detailed pattern of the corresponding UI on the basis of the usefulness of the detailed pattern measured at the process of executing the emotion-adaptive UI and the user experience information on the usefulness of each pattern stored.

Further, according to an embodiment of the present invention, a wearable device with an emotion-adaptive UI can be provided. Herein, according to an embodiment of the present invention, a wearable wrist device can be provided, the device including a collection unit for collecting bio-signals for recognizing user's biorhythm and emotion, and experiential data such as voice, and performing a pattern change in tactile and intensity in up, down, left, right, and composite direction in order to support emotion-adaptive UI of tactile type.

The invention claimed is:

1. A method of providing an emotion-adaptive user interface (UI) on the basis of affective computing, the method comprising:
   acquiring an input signal for emotion information of a user;
   providing service based on the emotion information through the emotion-adaptive UI; and
   calculating usefulness information for the service; and
   when the service is provided, detailed pattern of the emotion-adaptive UI is changed and provided on the basis of at least one of purpose information and the usefulness information included in user experience information.

2. The method of claim 1, wherein the detailed pattern usefulness information of the usefulness information is calculated on the basis of at least one of a difference between the emotion information at the start of the detailed pattern and the emotion information at the end of the detailed pattern and the purpose information of the service.

3. The method of claim 2, wherein the emotion information is generated based on at least one of bio-signal data, voice data, and video data of the user.

4. The method of claim 1, wherein the usefulness information corresponds to an evaluation index for the service provided through the emotion-adaptive UI, and is determined on the basis of the purpose information of the service.

5. The method of claim 1, wherein when the service is provided, the detailed patterns included in the service are changed in a manner to satisfy the purpose information of the service on the basis of the purpose information of the service.

6. The method of claim 3, wherein in a case that the detailed pattern is changed in a manner to satisfy the purpose information of the service, when the usefulness information calculated for the detailed pattern is equal to or greater than a threshold value according to a result of providing the service having the detailed pattern, it is determined that the purpose information of the service is satisfied.

7. The method of claim 1, wherein the service usefulness information of the usefulness information is calculated on the basis of at least one of the emotion information at the start of the detailed pattern of the service, the emotion information at the end of the detailed pattern, and the purpose information of the service.

8. The method of claim 1, wherein the service is configured with at least one of a service operation condition, a service end condition, and an emotion-adaptive UI service type on the basis of purpose information of the service, and wherein the emotion-adaptive UI service type is configured with one or more detailed patterns.

9. The method of claim 8, wherein the service operation condition and the service end condition include at least one of time information for operating the service, current emotion information, target emotion information, and place information.

10. The method of claim 8, wherein the emotion-adaptive UI service type includes a sound service, a display service, a vibration service, and a tactile service, and
   the service provided through the emotion-adaptive UI includes at least one of a sound service, a display service, a vibration service, and a tactile service.

11. The method of claim 8, wherein the detailed pattern corresponds to the detailed attribute for the emotion-adaptive UI service type, and corresponds to a method of controlling the emotion-adaptive UI service type.

12. The method of claim 1, wherein when the service is provided, the purpose information of the user experience information for the service is checked, and the detailed pattern included in the service is determined on the basis of the usefulness information included in the corresponding information.

13. The method of claim 1, wherein the input signal for the user emotion information includes at least one of bio-signal data, voice data, and video data of the user, and
    the emotion information is recognized on the basis of the input signal using an emotion recognition model.

14. The method of claim 1, wherein when default purpose information is selected as the purpose information of the service, the default purpose information includes emotion awakening purpose, emotion control purpose, and emotion consolation purpose.

15. The method of claim 1, wherein when a feedback is reflected on the operation of the emotion-adaptive UI based on the usefulness information for the provided service, information on the detailed pattern for the provided service is updated.

16. An apparatus for providing an emotion-adaptive user interface (UI) on the basis of affective computing, the apparatus comprising:
    an emotion recognition unit determining information for emotion recognition of a user and determining a user's emotion information on the basis of the information for emotion recognition of the user;
    an emotion-adaptive UI execution unit providing an emotion-adaptive UI based on the user's emotion information; and
    an emotion-adaptive UI/UX management unit managing an attribute information of the registered emotion-adaptive UI and a user experience information descriptor including a usefulness information on operations of the emotion-adaptive UI,
    wherein the emotion-adaptive UI/UX management unit calculates the usefulness information on the basis of the user's emotion information which varies in the process of providing the emotion-adaptive UI,
    wherein the emotion-adaptive UI execution unit changes a detailed pattern of the emotion-adaptive UI according to at least one of a designated purpose information and the usefulness information.

17. The apparatus of claim 16, wherein the usefulness information is calculated on the basis of at least one of the emotion information at the start of the detailed pattern, the emotion information at the end of the detailed pattern, and the designated purpose information.

18. The apparatus of claim 16, wherein the apparatus is provided to operate one or more emotion-adaptive UI service types from sound service, display service, vibration service, and tactile service.

19. The apparatus of claim 16, wherein the apparatus corresponds to a wearable device.

20. The apparatus of claim 16, wherein the emotion-adaptive UI execution unit changes the detailed patterns in a manner to satisfy the designated purpose information.

\* \* \* \* \*